(12) United States Patent
Patra (10) Patent No.: US 6,556,962 B1
(45) Date of Patent: Apr. 29, 2003

(54) METHOD FOR REDUCING NETWORK COSTS AND ITS APPLICATION TO DOMINO CIRCUITS

(75) Inventor: Priyadarsan Patra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/347,839

(22) Filed: Jul. 2, 1999

(51) Int. Cl.$^7$ .............................................. G06F 17/50
(52) U.S. Cl. ........................... 703/14; 703/13; 703/22; 716/4; 716/5; 716/7; 716/8; 716/18; 702/119; 705/7; 705/8; 705/10; 705/37
(58) Field of Search ............................ 702/119; 703/2, 703/22, 6, 13, 14; 705/7, 8, 10, 37; 716/4, 6, 7, 8, 18; 435/6

(56) References Cited

U.S. PATENT DOCUMENTS

| | | | | |
|---|---|---|---|---|
| 4,697,109 A | | 9/1987 | Honma et al. ............... | 307/475 |
| 5,331,568 A | * | 7/1994 | Pixley ........................... | 716/3 |
| 5,453,708 A | | 9/1995 | Gupta et al. .................. | 326/98 |
| 5,502,646 A | * | 3/1996 | Chakradhar et al. ........... | 716/4 |

(List continued on next page.)

FOREIGN PATENT DOCUMENTS

| | | | |
|---|---|---|---|
| EP | 0954101 | 3/1999 | ......... H03K/19/096 |
| JP | 59-039124 | 3/1984 | ......... H03K/19/096 |
| JP | 04-239221 | 8/1992 | ......... H03K/19/096 |

OTHER PUBLICATIONS

Puri et al., "Logic optimization by output phase assignment in dynamic logic synthesis", IEEE/ACM International Conference on Computer–Aided design, 1996.*

Xun Liu et al., "Minimizing sensitivity to delay vatriations in high performance synchronous circuits", Design, Automation and Test in Europe Confrerence, Mar. 1999.*

Bryant, R.E., "Graph–Based Algorithms for Boolean Function Manipulation", *IEEE Transactions on Computers*, C–35 (8), 677–691 (1986).

Chakradhar, S.T., et al., "An Exact Algorithm for Selecting Partial Scan Flip–Flops", *Proceedings, 31st Design Automation Conference*, San Diego, California, 81–86 (1994).

Chakravarty, S., "On the Complexity of Using BDDs for the Synthesis and Analysis of Boolean Circuits", *27th Annual Allerton Conference on Communication, Control, and Computing*, Allerton House, Monticello, Illinois., 730–739 (1989).

Patra, P., et al., "Automated Phase Assignment for the Synthesis of Low Power Domino Circuits", *Proceedings of the 36th ACM/IEEE Conference on Design Automation Conference*, 379–384 (1999).

Puri, et al., "Logic Optimization by Output Phase Assignment in Dynamic Logic Synthesis", *International Conference on Computer Aided Design*, (1996).

Thompson, S., et al., "Dual Threshold Voltages and Substrate Bias: Keys to High Performance, Low Power, 0.1 um Logic Designs", *1997 Symposium on VLSI Technology Digest of Technical Papers*, 69–70 (1997).

*Primary Examiner*—Samuel Broda
*Assistant Examiner*—K Thangavelu
(74) *Attorney, Agent, or Firm*—Schwegman, Lundberg, Woessner & Kluth, P.A.

(57) ABSTRACT

A system and method which reduce a network cost of a domino circuit. The network costs of domino circuits can be reduced by utilizing the methods and systems disclosed. The domino circuit is represented as a mixed integer linear program. The mixed integer linear program is solved to determine an implementation that includes determining a final phase assignment that reduces the network cost.

17 Claims, 11 Drawing Sheets

U.S. PATENT DOCUMENTS

| | | | | |
|---|---|---|---|---|
| 5,543,735 A | | 8/1996 | Lo | 326/93 |
| 5,568,062 A | | 10/1996 | Kaplinsky | 326/27 |
| 5,602,753 A | * | 2/1997 | Fukui | 716/4 |
| 5,657,256 A | * | 8/1997 | Swanson et al. | 702/119 |
| 5,661,675 A | | 8/1997 | Chin et al. | 364/768 |
| 5,668,732 A | * | 9/1997 | Khouja et al. | 702/60 |
| 5,671,151 A | | 9/1997 | Williams | 364/489 |
| 5,731,983 A | * | 3/1998 | Balakrishnan et al. | 716/18 |
| 5,748,012 A | | 5/1998 | Beakes et al. | 326/93 |
| 5,796,282 A | | 8/1998 | Sprague et al. | 327/210 |
| 5,815,005 A | | 9/1998 | Bosshart | 326/95 |
| 5,825,208 A | | 10/1998 | Levy et al. | 326/98 |
| 5,831,990 A | | 11/1998 | Queen et al. | 371/22.1 |
| 5,847,966 A | * | 12/1998 | Uchino et al. | 716/2 |
| 5,886,540 A | | 3/1999 | Perez | 326/93 |
| 5,892,372 A | | 4/1999 | Ciraula et al. | 326/96 |
| 5,896,046 A | | 4/1999 | Bjorksten et al. | 326/98 |
| 5,896,399 A | | 4/1999 | Lattimore et al. | 371/21.1 |
| 5,986,399 A | | 4/1999 | Lattimore et al. | 371/21.4 |
| 5,942,917 A | | 8/1999 | Chappell et al. | 326/121 |
| 6,002,272 A | | 12/1999 | Somasekhar et al. | 326/98 |
| 6,002,292 A | | 12/1999 | Allen et al. | 327/379 |
| 6,049,231 A | | 4/2000 | Bosshart | 326/98 |
| 6,052,008 A | | 4/2000 | Chu et al. | 327/200 |
| 6,060,910 A | | 5/2000 | Inui | 326/98 |
| 6,086,619 A | * | 7/2000 | Hausman et al. | 703/6 |
| 6,087,855 A | | 7/2000 | Frederick, Jr. et al. | 326/106 |
| 6,090,153 A | * | 7/2000 | Chen et al. | 716/8 |
| 6,104,212 A | | 8/2000 | Curran | 326/95 |
| 6,108,805 A | | 8/2000 | Rajsuman | 714/724 |
| 6,132,969 A | * | 10/2000 | Stouhton et al. | 435/6 |
| 6,133,759 A | | 10/2000 | Beck et al. | 326/98 |
| 6,204,696 B1 | | 3/2001 | Krishnamurthy et al. | 326/98 |
| 2001/0014875 A1 | * | 8/2001 | Young et al. | 705/37 |

* cited by examiner

METHOD FOR REDUCING NETWORK COSTS AND ITS APPLICATION TO DOMINO CIRCUITS

FIELD

This invention relates generally to domino circuits, and more particularly to reducing network costs for domino circuits.

BACKGROUND

The speeds at which electronic circuits are required to perform is constantly increasing. As the overall processor speed becomes faster, the need for faster internal circuitry has increased. The need for high speed circuits is not limited to processors, but applies everywhere from cellular phones to digital broadcast receiver systems. Many hand held devices use application specific integrated circuits (ASICs) and they must approach microprocessor frequency targets but have an even tighter area budget. A way to increase the speed of a circuit is to use domino circuits (dynamic logic circuits) instead of static CMOS circuits. A domino circuit includes one or more domino gates. A typical domino gate has a precharge transistor, an evaluate transistor, and an inverting buffer. Domino circuits are generally faster than circuits implemented in CMOS static circuits. For example, domino circuits typically account for thirty percent of the logic transistors of a microprocessor.

Domino circuits have a number of network costs which designers desire to reduce. Some of these costs are power consumption and area.

The use of domino circuits in high-performance microprocessor design is an efficient way of meeting demanding circuit speeds without exorbitant area penalty and high clock-loading implied by static CMOS implementations. One kind of Domino logic style allows a single clock to precharge and evaluate a cascade of dynamic logic blocks where a static CMOS inverting buffer or latch appears at the output of each dynamic logic gate. Despite various area and speed advantages, the safest and the fastest domino design styles can only implement logic networks without invertors because of the inherent monotonic nature of domino circuits. However, this fundamental constraint of implementing logic functions without any intermediate inversions implies significant area overhead from logic duplication for generating both the negative and positive signal phases—the so-called "dual-rail" implementations.

CMOS static logic is synthesized using the flexibility of manipulating inverters in the logic network. The inverter-free constraint in domino logic design limits this flexibility since it may require logic duplication because of the inverter-free constraint. This constraint implies that all logic inversions should be performed at the primary inputs or primary outputs where the inverters can be absorbed in registers.

Currently, a way to convert a logic circuit into an inverter free domino logic circuit is to convert the logic circuit into AND, OR, and NOT gates only. Then, the inverters can be propagated back from the primary outputs towards the inputs by applying simple De Morgan's laws. Some inverters may not be capable of being propagated all the way to a primary input and will be trapped. Since these inverters cannot be removed, the gate at which the inverter is trapped requires duplication to be implemented. This duplication generally causes substantial area, power consumption, timing, and reliability penalties.

There are some ways to reduce this duplication penalty. Considering a combinational logic function, the process of propagating an inverter forward is similar to choosing an implementation phase or polarity of the outputs that eliminates this inverter. This process can be very complex with exponential possibilities. Moreover, some inverters may need to be propagated back and some invertors get trapped and can only be removed by fanin cone duplication alluded to above. Since there are $2n$ possible phase assignments for implementing n primary outputs, it is difficult to find an ideal output phase assignment to minimize area or other network costs, a matter further complicated by design constraints related to the availability of only some input polarities and the need for particular polarities at specific primary outputs, etc. Arbitrarily choosing phase assignments can result in substantial network costs and synthesis quality.

If the various network costs associated with domino circuits could be reduced, processors and ASICs could be produced that are faster and cheaper. Any use of domino circuits could be improved. What is needed is a way to reduce the network costs associated with domino logic.

SUMMARY

One embodiment of the present invention provides a method for reducing a network cost of a domino circuit. The domino circuit is represented as a mixed integer linear program. The mixed integer linear program is solved to determine an implementation that includes determining a final phase assignment that reduces the network cost.

Other embodiments are described and claimed.

DETAILED DESCRIPTION

Approaches to reduce network costs by an implementation in a domino circuit or dynamic circuit are described herein. It will be understood by reading the description that there is a relation between network costs and phase assignments for domino circuits. There are a number of network costs associated with domino circuits such as power consumption, area used, gate toggles, maximum negative slacks (meaning the largest timing violation), logic testability, noise-immunity and reliability. Thus, the network costs of a domino circuit can be reduced by manipulating the phase assignments for the domino gates in the domino circuit and determining which gates should be implemented. Any number of approaches may be used to reduce the network costs by manipulating the phase assignments. One of the costs that can be reduced is area. In one embodiment, a mixed integer linear program is used that generates coefficients for each gate that correspond to the cost of that gate in terms of the network cost being reduced. The circuit is represented by a mixed integer linear program and includes modeling of the cost to be reduced. Variables are used to represent gates, inputs, and outputs. The various coefficients for the variables are determined and a solution is found. The solution produces a phase assignment and choice(s) of logic implementation for reducing the network cost.

In the following detailed description of exemplary embodiments of the invention, reference is made to the accompanying drawings which form a part hereof, and in which are shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
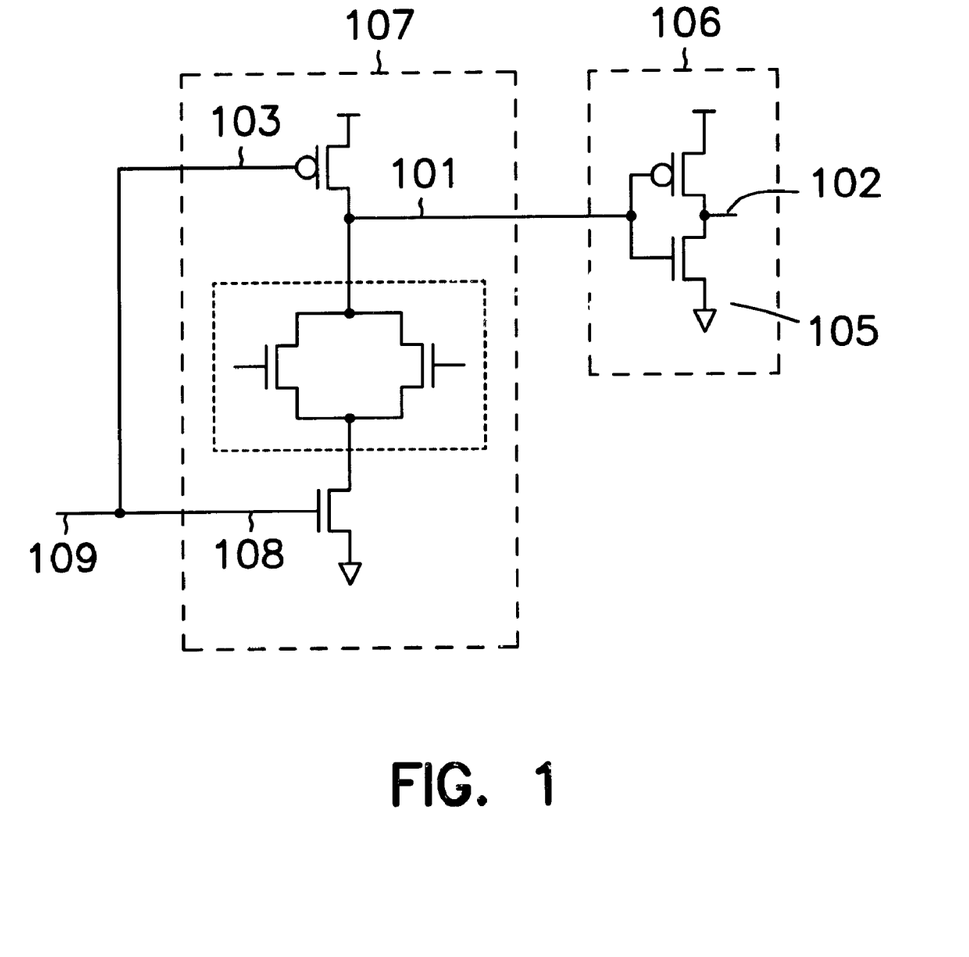
FIG. 1 is a basic domino gate.

The domino circuit is a circuit that is made up by at least some domino gates. A basic N-type domino gate is shown in FIG. 1. FIG. 1 shows an output $O_1$ 101 of the dynamic gate, an output $O_2$ 102 of the static gate, a precharge transistor 103, a dynamic portion 107, a static portion 106, an inverting buffer 105, an evaluate transistor 108, and a clock 109. A domino gate includes a dynamic component and a static component. During a precharge phase, the output of the dynamic gate is precharged high, and the output of the buffer is low. When the gate is evaluated, the output will conditionally discharge and result in the output conditionally becoming high.

For a domino circuit as shown in FIG. 1, the signal probability of a gate is the probability that the logical output of a gate is high and the switching probability of a gate is the probability that the output experiences a transition. So, if $p_g$ is the signal probability of logical output $O_2$ of gate g, then $S_g$, the switching probability at both $O_1$ and $O_2$ is exactly $p_g$. If the logical output of $O_2$ is high, then the output $O_1$ must be low. This means that the dynamic portion of the gate discharged the precharged current. Furthermore, the output will need to be precharged during the next clock cycle. Thus, the probability of a transition at $O_1$ is precisely the signal probability at $O_2$. Furthermore, $O_2$'s output experiences a transition if and only if $O_1$ experiences a transition. Hence, the switching probability at $O_2$ is also the signal probability at $O_2$.

Figure 2:
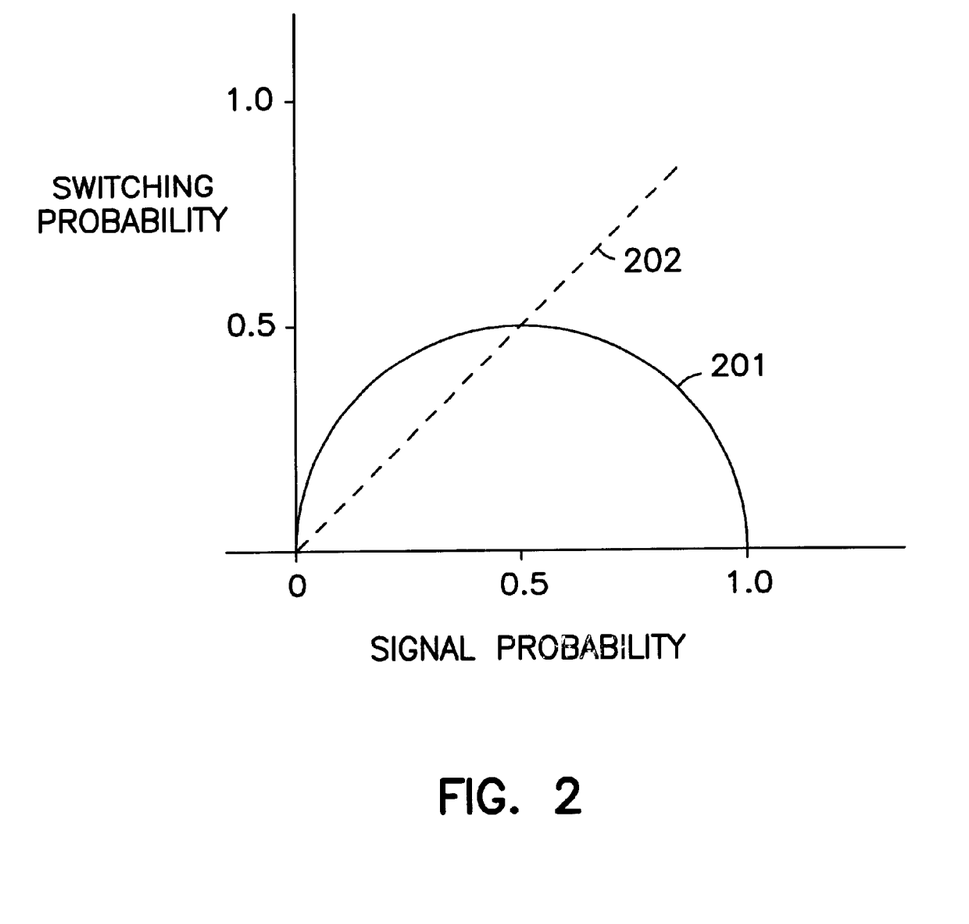
FIG. 2 shows signal probability and switching for domino and static CMOS logic.

In the case where the logical output of the gate at $O_2$ remains "0", no charging or discharging takes place anywhere in the gate, and so no power is dissipated. In contrast to static gates, domino gates experience an asymmetry in switching activity with respect to signal probability. FIG. 2 shows a comparison of the two types of gates. FIG. 2 shows the relation of switching probability to signal probability for static gates 201 and domino gates 202.

Once a gate discharges current, its output cannot be recharged until the next clock cycle. Hence, any glitch that appears at the inputs of a domino block sets a chain of monotonic transitions that cannot be reversed until the next clock cycle. The consequence is that since domino gates generally do not glitch, the switching activity can be modeled correctly under a zero delay assumption. Therefore, if the exact signal probability for each logical output of a domino gate is known, then an exact measure of the total switching activity in a domino block is also known.

Domino blocks should be synthesized without logical inverters because domino logic is inherently noninverting. Thus, to implement logic into domino logic, the logic must be inverter free. See article, Puri, Bjorksten, and Rosser, "Logic optimization by output phase assignment in dynamic logic synthesis, International Conference on Computer Aided Design, pages 2–8, 1996, for a proposed method for synthesizing inverter free blocks. As explained, a standard technology independent synthesis is first performed. Inverters then appear at arbitrary points in this initial realization. Then, inverters are systematically removed by changing the phase of primary outputs and applying DeMorgan's Law. Refer to FIGS. 3A, 3B, 3C and 3D for an illustration of one example of this method. For example, to synthesize the logic functions:

$$f=\overline{(a+b)+(c\times d)}$$

$$g=(a+b)+(c\times d)$$

Figure 3A:
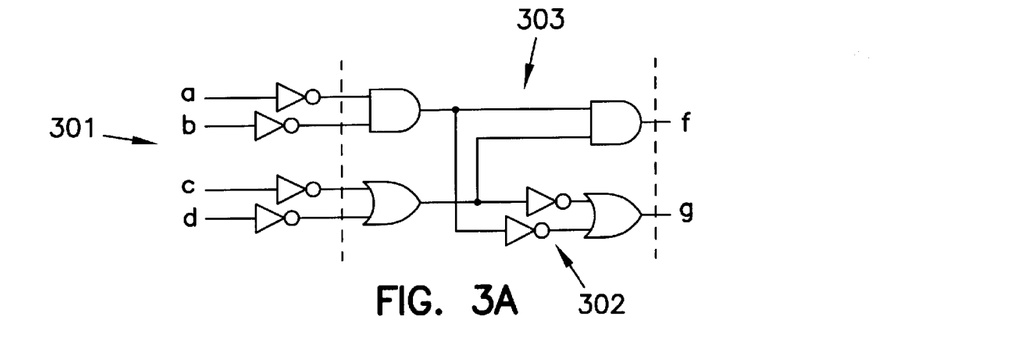
FIGS. 3A, 3B, 3C, and 3D show an example of removing inverters.
Figure 3B:
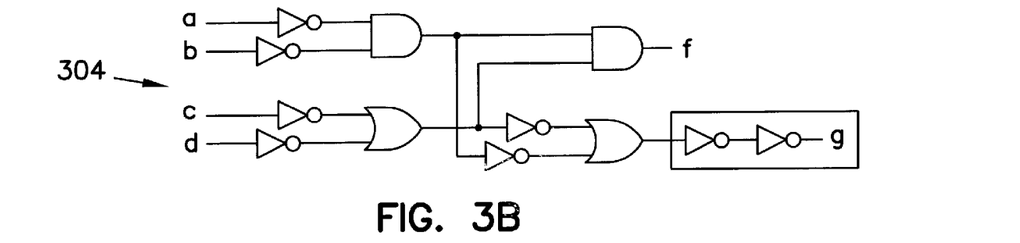
Figure 3C:
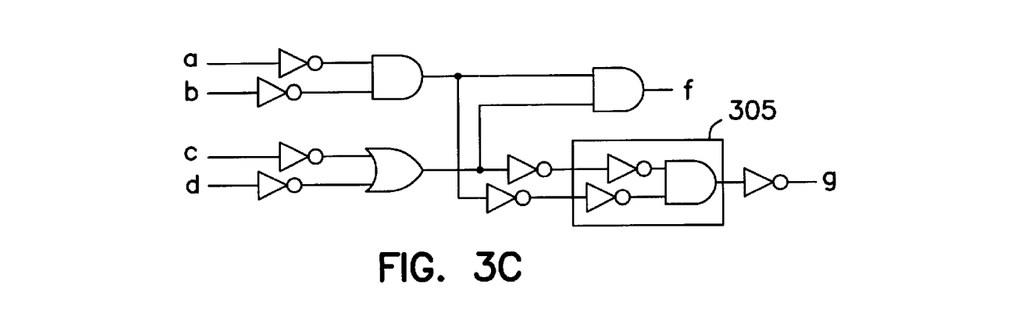
Figure 3D:
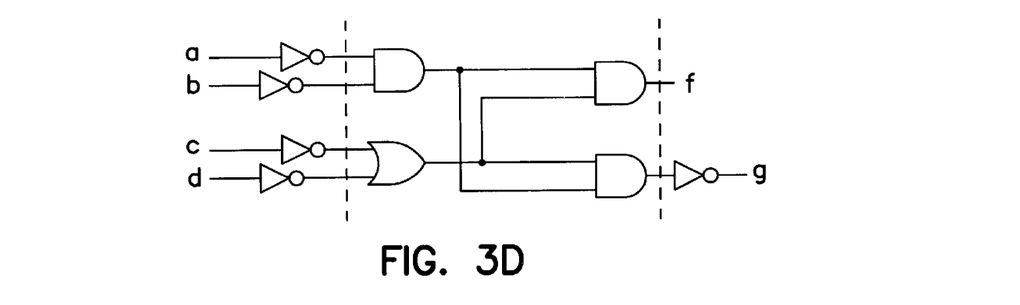
Figure 4A:
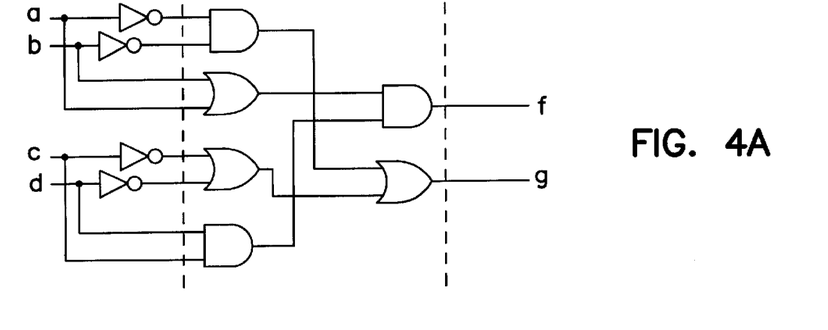
FIGS. 4A, 4B, 4C, and 4D show different phase assignments and resulting area overhead.
Figure 4B:
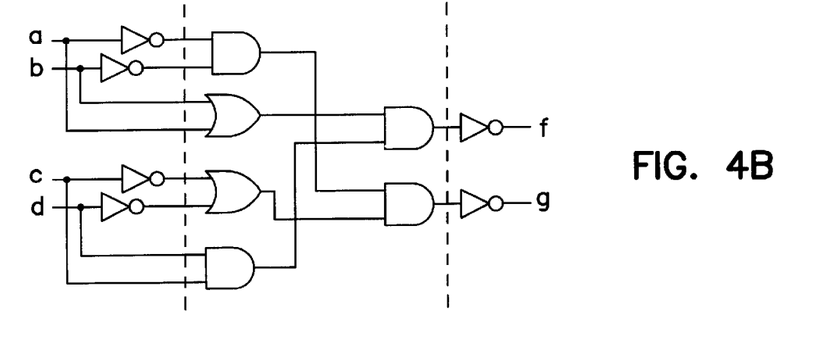
Figure 4C:
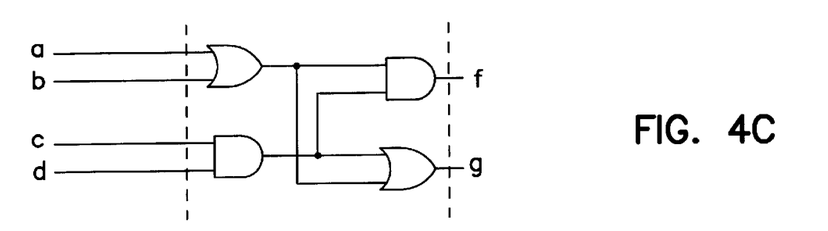
Figure 4D:
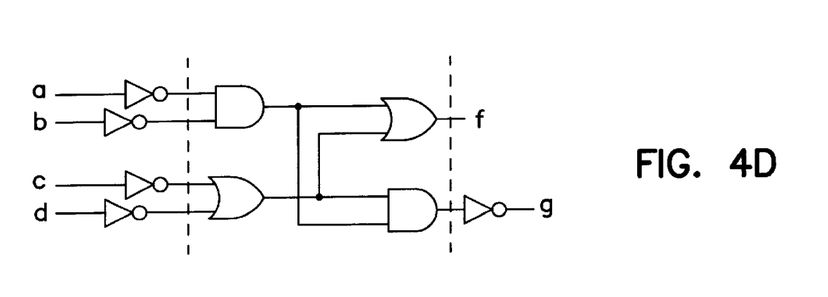

First, an initial synthesis is implemented in FIG. 3A. FIG. 3A shows an initial result of technology independent synthesis 301. The zone within the boundaries 303 must become inverterless, so the inverters 302 need to be removed. Note that this realization 301 cannot be implemented in domino logic because of the internal inverters. Hence, "changing the phase" 304 of output g is tried in FIG. 3B. An output is in positive phase if no inverter appears at the output boundary. An output is in negative phase if an inverter appears on the output boundary. Note that a "negative phase" assignment does not mean that the polarity of the output is changed. A negative phase assignment does not mean that we are implementing the complement of the original output. In the example, the initial synthesis of f is implemented in the negative phase, and g is implemented in the positive phase. In FIG. 3B, the phase of g is changed (and preserves the logical value of g) by placing two "logical" inverters on the output g. In FIG. 3C, the inverter is pushed back and DeMorgan's law is applied 305 to transform the OR gate into an AND gate. Finally, as shown in FIG. 3D, the chained inverters are removed. In general, phase assignment is not as straightforward as this example. The reason is that the backward propagation of inverters may result in "trapped inverters" which cannot be removed without significant logic duplication. For an example of "trapped inverters" consider FIGS. 4A, 4B, 4C, and 4D. In FIG. 4A and FIG. 4B, if f and g are implemented in the positive phase or if they are implemented in the negative phase, then an area penalty in terms of duplicated logic occurs. In general, if a circuit has k outputs then there are $2_k$ possible phase assignments for the circuit. This is because phase assignments for different outputs interact and affect the final realization of the circuit.

Area duplication is due to conflicting phase assignments, and this is related to some extent to the degree of total overlap of the transitive fanin of the primary outputs. This is shown in Puri, Bjorksten, and Rosser, "Logic optimization by output phase assignment in dynamic logic synthesis", International Conference on Computer Aided Design, pages 2–8, 1996. By choosing an appropriate phase assignment, the area used by a domino circuit can be reduced.

An arbitrary boolean network or circuit can be implemented in domino logic using the dual rail version of the network with its associated penalties. However, a single rail implementation can be sufficient if those outputs and/or the circuit's primary inputs are bounded by latches. The latches can be used to generate complementary phases at the input or at the output as needed by the monino's monotonic logic. Then, the basic optimization problem is to determine the best phase of each output to retain in the circuit to minimize whatever network cost is to be minimized.

Figure 5A:
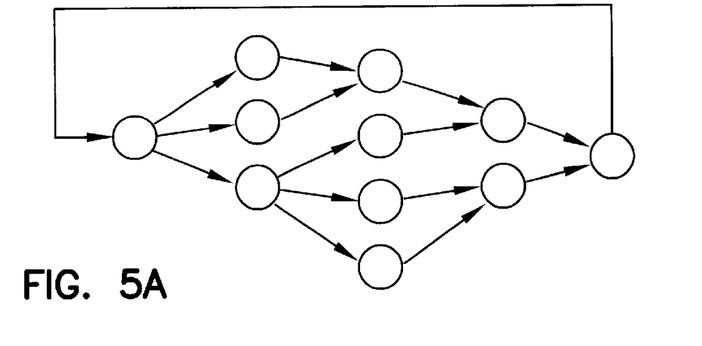
FIG. 5A shows a sequential circuit.
Figure 5B:
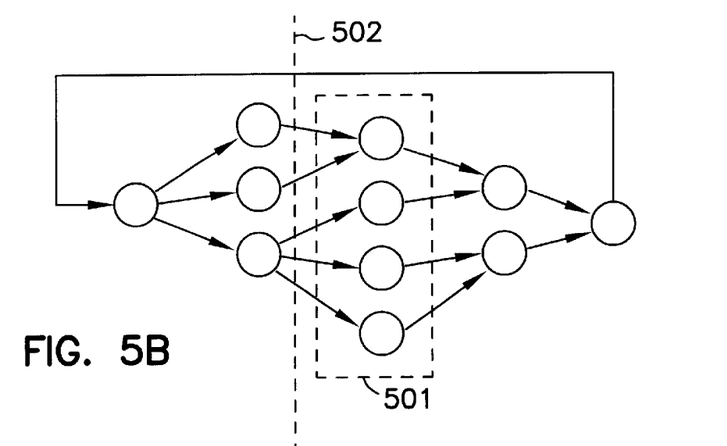
FIG. 5B shows a sequential circuit partitioned.
Figure 5C:
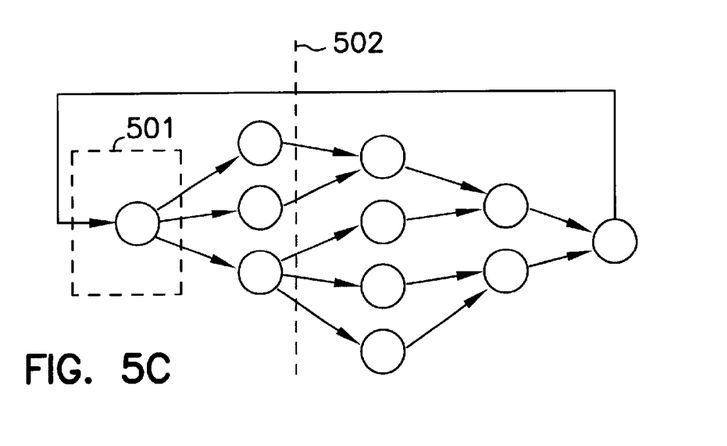
FIG. 5C shows a sequential circuit partitioned.
Figure 6A:
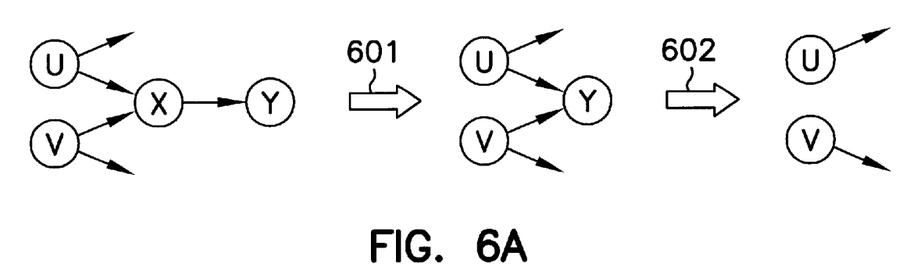
FIGS. 6A, 6B, 6C shows transformations to generate a greatly reduced vertex set.
Figure 6B:
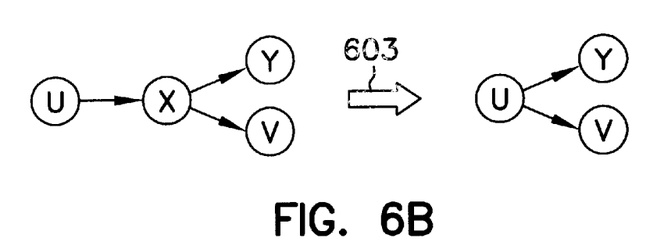
Figure 6C:
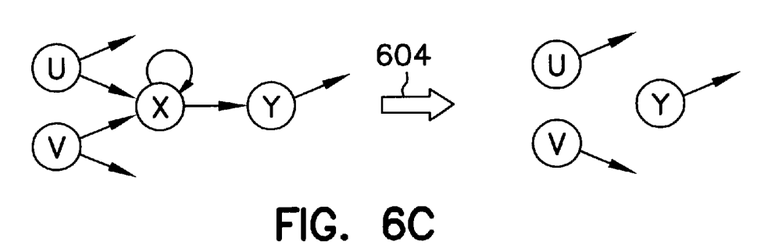
Figure 7:
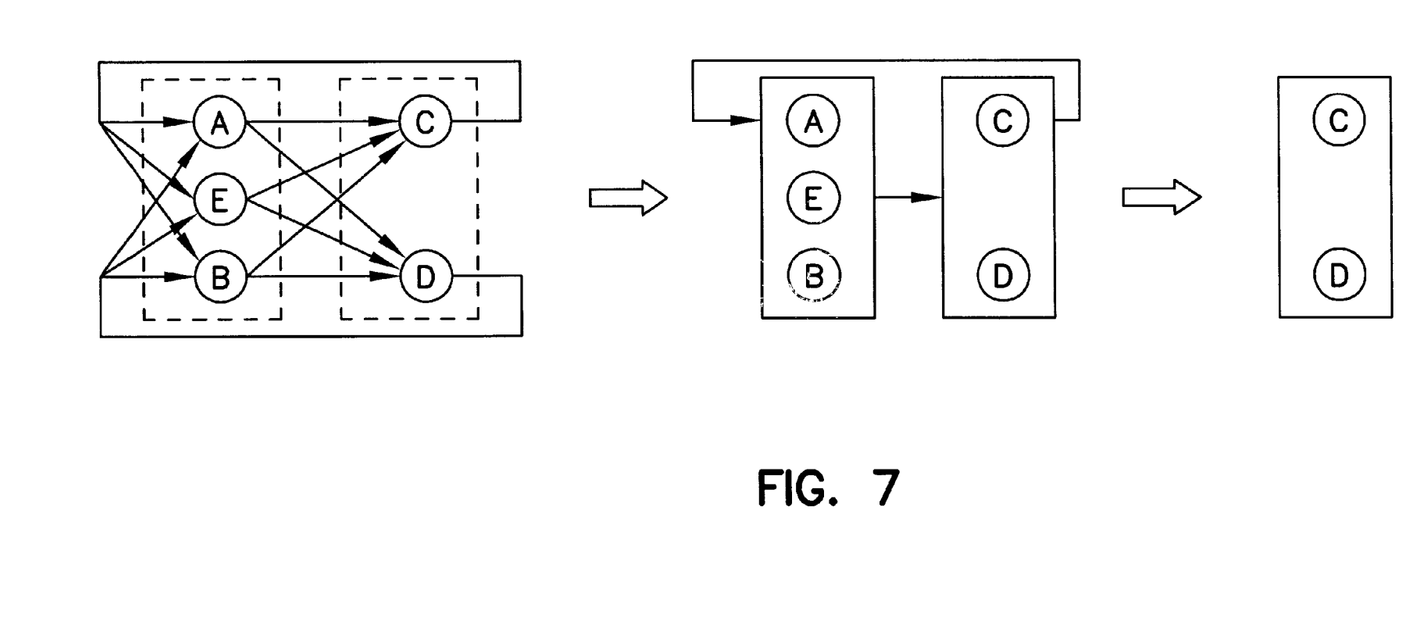
FIG. 7 shows a transformation to generate MFVS.

Domino circuits can have feedback which can cause them to be difficult to analyze. To analyze a domino circuit to reduce network costs, the domino circuit can be partitioned into a combinational block. Generally, a determination is made as to the minimum number of feedback loops to cut to partition the sequential blocks into combinational blocks. An enhanced minimum feedback vertex set heuristic that takes advantage of the properties of domino logic blocks to effectively partition sequential blocks into combinational blocks may be used. This heuristic requires transforming the circuit into an s-graph. FIGS. 5A, 5B, and 5C show a representation of a domino circuit in an s-graph with partitioning 502 and new primary inputs 501. FIG. 5A shows an original s-graph of a sequential circuit. FIG. 5B shows one partitioning of the circuit. FIG. 5C shows a second partitioning that results in a combinational block with fewer primary inputs. An s-graph is a directed graph representing structural dependencies (edges) among flip-flops (vertices). The nodes or vertices of the graph represent various gates of the circuit. The s-graph can be transformed to obtain a greatly reduced vertex set by using concepts of strongly connected components. FIGS. 6A, 6B, and 6C show three transformations performed on an s-graph to obtain the greatly reduced vertex set. FIGS. 6A, 6B, and 6C shows the fanins and fanouts of a node X which is being eliminated from further consideration as a result of applying the transformations. In FIG. 6A, node X is ignored 601 and then node Y is ignored 602. In FIG. 6B, node X is ignored. In FIG. 6C, node X is removed 604. The algorithm described in S. T. Chakradhar, A. Balakrishnan, and V. D. Agrawal, "An exact algorithm for selecting partial scan flip-flops", Design Automation Conference, pages 81–86, 1994 is used iteratively to apply three transformations and use the concepts of strongly connected components to reduce an s-graph, in polynomial time, to obtain a greatly reduced vertex set. A fourth transformation can be used to convert the greatly reduced vertex set into a minimum feedback vertex set. This fourth transformation can be used when none of the first three transformations can be used to further reduce the s-graph. The s-graph is transformed by grouping vertices with identical fanins and identical fanouts into a weighted supervertex as shown in FIG. 7. FIG. 7 shows the vertices A, B and E form a supervertex ABE with weight 3, and vertices C and D combine to form supervertex CD with weight 2. The greatly reduced vertex set is reduced to a minimum feedback vertex set. This can be accomplished by using heuristics or using exponential, but exact, algorithms. The resulting minimum feedback vertex set is a set of combinational blocks. The combinational blocks are blocks of the circuit without feedback to other blocks. Thus, the signal probability of one combinational block does not affect the signal probability of another combinational block. The resulting combinational blocks are disjoint blocks of the domino circuit.

To reduce some of the network costs, it may be necessary to compute the signal activity of each gate in the domino circuit. A way to compute signal activity at each gate is to use binary decision diagrams (BDDs) to compute the signal probability at each circuit node. See, Sreejit Chakravarty, "On the complexity of Using BDDs for the Synthesis and Analysis of Boolean Circuits", Allerton Conference on Communication, Control and Computing, pages 730–739, 1989. Chakravarty discusses using symbolic representation techniques for circuits. The complexity of the calculations can be reduced by maximizing sharing of nodes in the reverse order binary decision diagrams (ROBDD). This reducing can be accomplished by utilizing that domino blocks are highly flattened and a node's average fanout is high, the overall circuit is highly convergent (nodes near the primary inputs have greater fanouts than nodes near the primary outputs), and most signals in a block of control domino logic feed gates at the same topological level in the circuit. Thus, there is a heavy overlap of logic cones in the domino implementation.

The BDD variables are ordered in the reverse of the order that the circuit inputs are first visited when the gates are topologically traversed and gates that are at the same topological level are traversed in the decreasing order of the cardinality of their fanout cones. The signal probability is computed incrementally by the nodes.

Figures 8A, 8B:
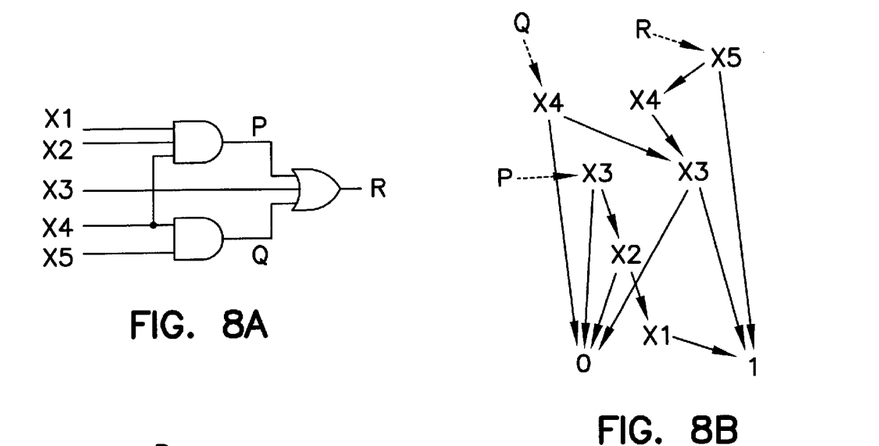
FIG. 8A is a circuit.
FIG. 8B shows two possible topologicl orders for visiting the gates.
Figure 8C:
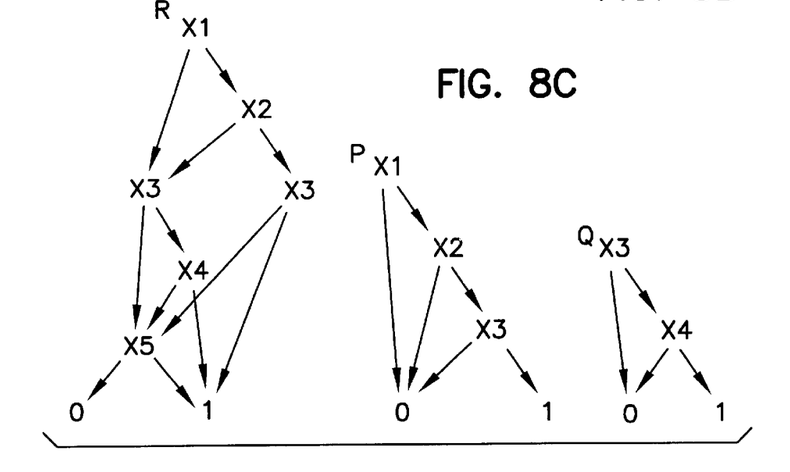
FIG. 8C show topological ordering.
Figure 8D:
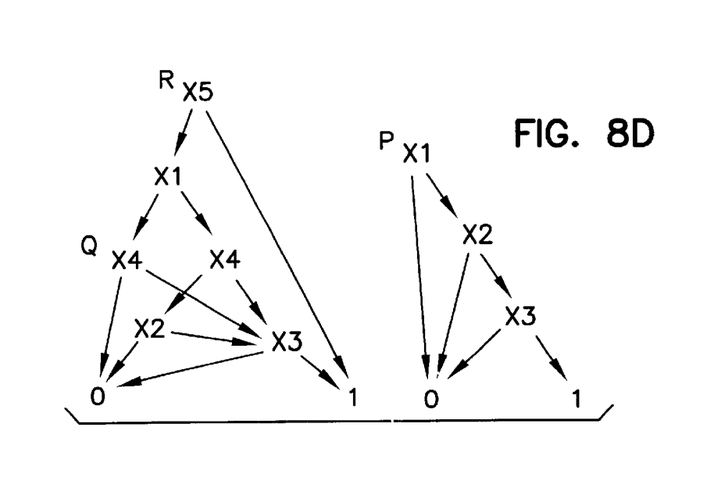
FIG. 8D shows the BDDs obtained if natural grouping is violated.

FIG. 8 shows an example of this BDD ordering. In FIG. 8A, a circuit with nodes P, Q and R is depicted. The two possible topological orders for visiting the gates are P, Q, R and Q, P, R as shown in FIG. 8B. The first order implies that primary inputs x1, x2, and x3 are used first and then x4 and x5. The input names stand for the variables in the BDDs which are constructed for all circuit nodes P, Q, and R. The initial BDD ordering should be x5, x4, x3, x2, x1. It only requires 7 non-leaf BDD nodes to represent all the circuit nodes. The second row, FIG. 8C, of BDDs are obtained when the topological ordering x1, x2, x3, x4, x5 is used. This requires 11 BDD nodes. The bottom row, FIG. 8D, shows the BDDs obtained if the natural grouping is violated and the primary inputs are arbitrarily combined. The ordering here is x5, x1, x4, x3, x2. The last BDD variable ordering requires 9 non-leaf BDD nodes and has the variable x1 "unnaturally sandwiched" between x5 and x4. The signal probability at each circuit node can be computed by using the BDD variables.

Figure 9:
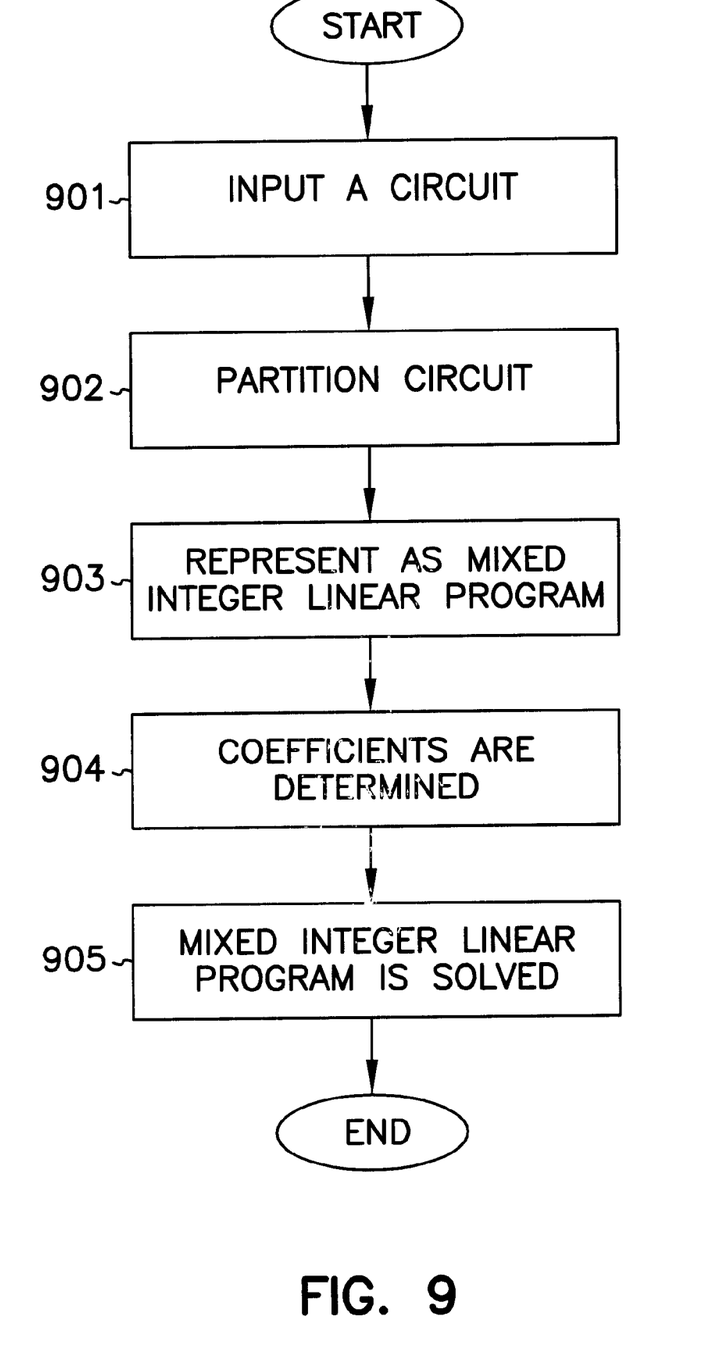
FIG. 9 is a method for reducing a network cost of a domino circuit according to an embodiment of the invention.

Referring to FIG. 9, a method for reducing a network cost is shown. This method takes as input a circuit 901. The circuit implements both phases of the outputs, has been minimized by traditional logic minimization, has been technology mapped to any existing domino library and has no intrinsic inverters. Any type of circuit such as sequential or combinational is allowed.

The circuit may be partitioned into combinational blocks 902. The circuit can be represented as an s-graph. The circuit is represented as a very low complexity mixed-integer linear program 903.

Figure 10:
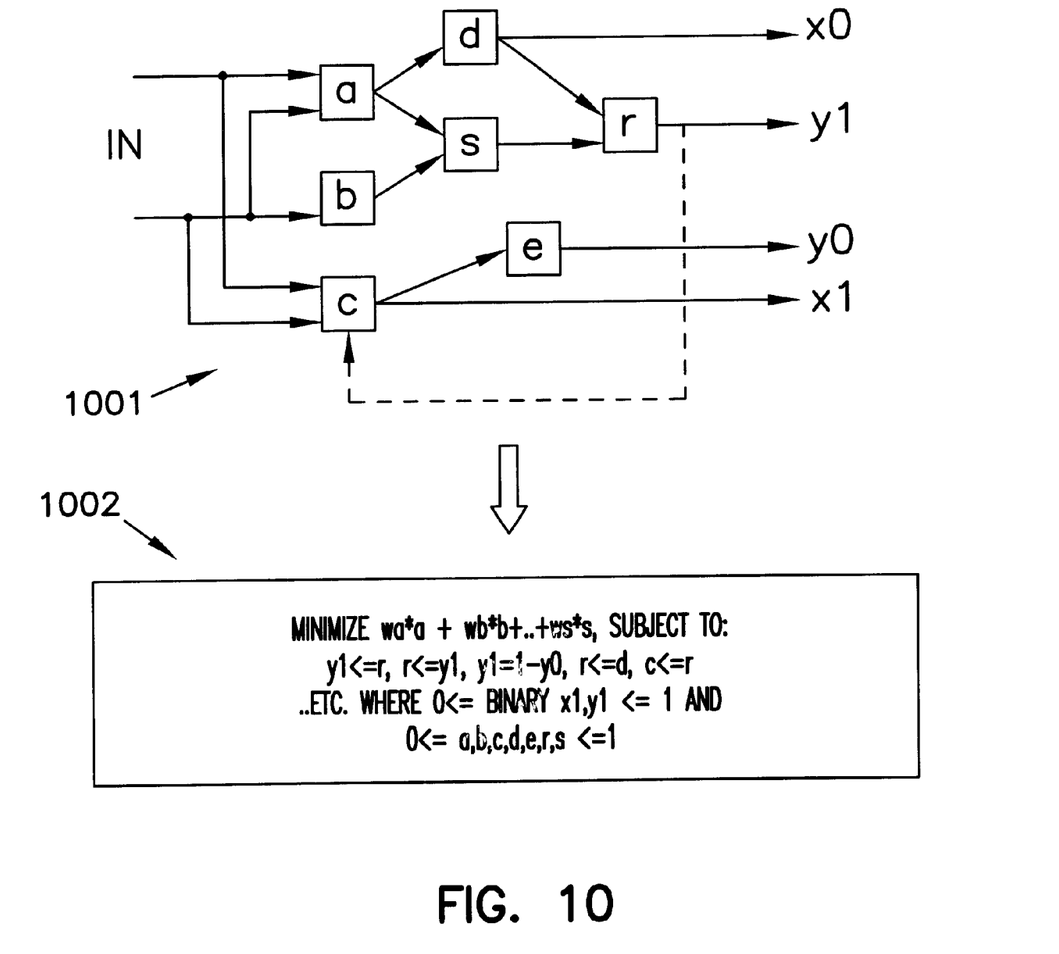
FIG. 10 shows a domino circuit translated to an ILP representation.

Referring to FIG. 10, an s-graph of a circuit 1001 and an equivalent mixed integer linear program (ILP) 1002 are shown. This representation can be done by exploiting the following three major facts: (1) The logic functionality of the logic nodes may be ignored and only their topology or connectivity need be considered. Each directed edge between two logic nodes turns into a simple constraint in the mixed integer linear program. (2) Theoretical arguments prove that the linear program may involve "binary" variables no more than the number of primary outputs to be optimized. Integer variables account for exponential complexity in an ILP. All other variable in the ILP can be made continuous bounded by 0 and 1, making it significantly tractable. (3) Continuous variables are further reduced by grouping nodes into "equivalence" classes.

In some embodiments, a binary variable represents each output. Some outputs may be set according to a user so that they are not modified so that if a user wants some logic to remain unchanged, only the other phase assignments affecting the other outputs are modified.

The nodes are represented by continuous variables bounded by 0 and 1. The nodes also have a coefficient representing the costs of that gate in terms of power.

The coefficients for the variables representing the nodes are determined 904. Each node or gate has a coefficient determined for it. The coefficient value depends on how it is being modeled and what network cost is desired to be reduced. If area is the network cost and it is being modeled as a linear function of gate area, the coefficient is set to the area estimate for that gate or node. If power is the network cost and it is being modeled as an average number of gate toggles, the coefficient is set to the activity at that gate. The activity at that gate is the signal probability. Ways to determine signal probability have been described above.

If power is the network cost to be reduced, it may also be modeled as an average weighted switched power. The concern here is how much capacitance is switched on average. The switching capacitance for the gate is set to an estimated capacitance. The coefficient is then equal to the activity at the gate times the switching capacitance. If capacitance is the network cost, it can be modeled as a wire load model, the coefficient is determined by the fanin wire capacitance contribution modulated by the driver gate's activity. The driver gate is the gate driving this fanin. The coefficient is set to the gate cost plus the activity at each gate times the fanin wire capacitance.

If performance is the network cost to be reduced, the capacitance or other aspects may be used to model the performance cost.

Macro models may be used for specific node costs such as a macromodel for area or power of a gate in the circuit. Models may even be combinations of other models so that more than one network cost can be reduced at a time.

Logical effort and gain of a gate can be combined with its area or capacitance cost via a simple affine function to determine the relevant coefficient in the expression for the network's cost.

Other network costs which are not described here may be modeled to determine coefficients for those network costs. This method can utilize any flexible linear cost function.

With the coefficients generated, the mixed integer linear program is solved 905, see FIG. 9. The gates and outputs are implemented if the corresponding variable is 1 in the mixed integer linear program's solution. The gates and outputs with corresponding variables that are not 1 are not implemented. The phase assignments are assigned. Alternative implementations may use different types of variables and values for those variables. See also, "POWER CONSUMPTION REDUCTION FOR DOMINO CIRCUITS", Ser. No. 09/347,842, filed Jul. 2, 1999 by Patra et. al for a further discussion of reducing power consumption for domino circuits.

This method can be given a resource limit such as a time limit and return with a solution within that time. However, this may not result in a phase selection that is as good as without a resource limit.

Figure 11:
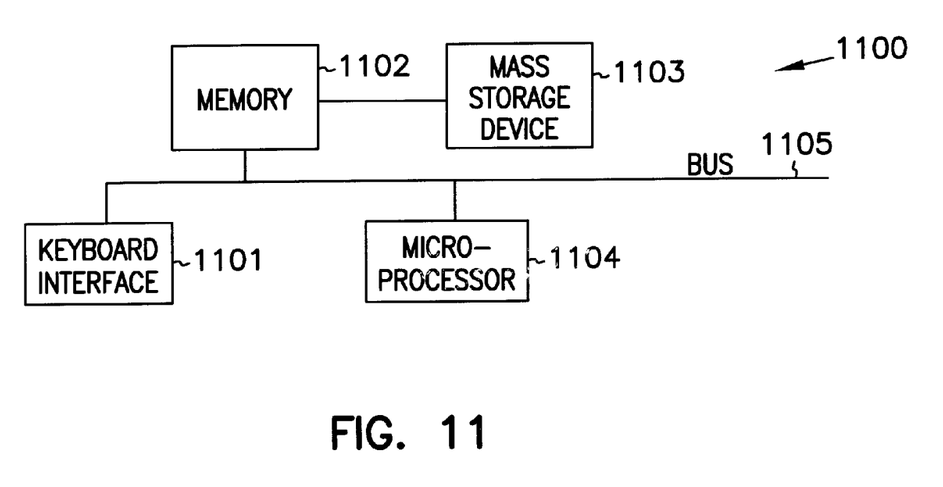
FIG. 11 is a computer system with which embodiments of the invention may be used.

FIG. 11 is a block diagram of a computer system 1100. The computer system is an example of a system on which a computer-readable medium having computer-executable instructions for reducing network costs of domino circuits may be run. The computer system 1100 comprises bus 1105, keyboard interface 1101, external memory 1102, mass storage device 1103 and processor 1104. Bus 1105 can be a single bus or a combination of multiple buses. Bus 1105 provides communication links between components in the computer system. Keyboard interface 1101 can be a dedicated device or can reside in another device such as a bus controller or other controller. Keyboard interface 1101 allows coupling of a keyboard to the computer system and transmits signals from a keyboard to the computer system. External memory 1102 can comprise a dynamic random access memory (DRAM) device, a static random access memory (SRAM) device, or other memory devices. External memory 1102 stores information from mass storage device 1103 and processor 1104 for use by processor 1104. Mass storage device 1103 can be a hard disk drive, a floppy disk drive, a CD-ROM device, or a flash memory device. Mass storage device 1103 provides information to external memory 1102.

Processor 1104 includes a single register file containing both speculative values and architecturally visible values. The processor 1104 may be compatible with, but is not limited to, processors such as an Intel® architecture processor, manufactured by Intel Corporation of Santa Clara, Calif. In alternate embodiments, the processor 1104 is compatible with a PowerPC™ architecture processor, an Alpha™ architecture processor, and the like. It is appreciated that at least some embodiments of the processor of the present invention are pipelined.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefor, it is manifestly intended that this invention be limited only by the following claims and equivalents thereof.

I claim:

1. A method for reducing a network cost of a domino circuit comprising:

representing the domino circuit as a mixed integer linear program;

representing gates of the domino circuit as variables;

generating a coefficient for at least one of the variables of the mixed integer linear program by modeling the network cost for the gate associated with the variable, wherein generating coefficients comprises setting the coefficient for each node by a value determined from the network cost; and solving the mixed integer linear program to determine an implementation that includes determining a final phase assignment that reduces the network cost.

2. The method as in claim 1, further comprising partitioning the circuit into combinational blocks.

3. The method as in claim 2, wherein partitioning the circuit into combinational blocks comprises:

determining a minimum set of feedback loops to cut; and cutting the minimum set of feedback loops into the combinational blocks.

4. The method as in claim 2, wherein partitioning the circuit into combinational blocks comprises:

transforming the circuit into an s-graph;

transforming the s-graph by grouping vertices which have identical fanins and identical fanouts into weighted supervertex;

iteratively applying three transformations and using the concept of strongly connected components to reduce the s-graph in polynomial time to obtain a greatly reduced vertex set; and reducing the greatly reduced vertex set to a minimum feedback vertex set.

5. The method as in claim 1, wherein generating coefficients comprises:

upon the network cost being modeled as a linear function of gate area, setting the coefficient for each node to the area estimate for that node;

upon the network cost being modeled as an average number of gate toggles, setting the coefficient for each node to the activity at that node;

upon the network cost being modeled as an average weighted switch power, setting the coefficient for each node to the activity at that node times the switching capacitance;

upon the network cost being modeled as a wire load model, setting the coefficient for each node to a gate cost plus the activity at each gate times the fanin wire capacitance; and upon the network cost being modeled as a logical depth, setting the coefficient for each node to the gate cost times the logical depth of that gate.

6. The method as in claim 1, further comprising:

determining by a user that one or more outputs are to remain unaltered; and excluding those outputs from being altered in the mixed integer linear program.

7. The method as in claim 1, further comprising:

selecting some of the gates by a user to remain in the implementation unaltered; and selecting some outputs of the domino circuit to remain in the implementation unaltered.

8. The method of claim 1, wherein representing the circuit as a mixed integer linear program comprises:

representing each gate of the circuit with a continuous variable;

representing each output of the circuit with a binary variable; and representing the network cost of each gate with a coefficient for each gate.

9. The method of claim 6, wherein solving the mixed integer linear program comprises:

implementing only those gates with corresponding variables that have been solved and have a predetermined value.

10. The method of claim 6, wherein solving the mixed integer linear program comprises:

implementing only those gates and outputs with corresponding variables that have a value of 1.

11. A system for reducing a network cost comprising:

a domino circuit having a plurality of gates, a plurality of outputs, and an output phase assignment; and a means for determining a reduced network cost domino circuit by generating a coefficient for at least one of the variables of a mixed integer linear program representing the domino circuit by modeling a network cost for the gate associated with the variable, wherein generating coefficients comprises setting the coefficient for each node by a value determined from the network cost, the reduced network cost domino circuit can perform the equivalent logic, the reduced network cost domino circuit has at least some of the plurality of gates and a final phase assignment, and the reduced network cost domino circuit has a network cost less than the domino circuit.

12. The system of claim 11, wherein the network cost is area.

13. The system of claim 11, wherein the network cost is power.

14. The system of claim 11, wherein the network cost is performance.

15. A system for reducing a network cost comprising:

a domino circuit having a plurality of gates, a plurality of outputs, and an output phase assignment; and a logic unit for determining a reduced network cost domino circuit by generating a coefficient for at least one of the variables of a mixed integer linear program representing the domino circuit by modeling a network cost for the gate associated with the variable, wherein generating coefficients comprises setting the coefficient for each node by a value determined from the network cost, the reduced network cost domino circuit can perform the equivalent logic, the reduced network cost domino circuit has at least some of the plurality of gates and a final phase assignment, and the reduced network cost domino circuit has a network cost less than the domino circuit.

16. A computer-readable medium having computer-executable instructions for reducing a network cost of a domino circuit comprising:

representing the domino circuit as a mixed integer linear program representing gates of the domino circuit as variables;

generating a coefficient for at least one of the variables of the mixed integer linear program by modeling the network cost for the gate associated with the variable, wherein generating coefficients comprises setting the coefficient for each node by a value determined from the network cost; and solving the mixed integer linear program to determine an implementation that includes determining a final phase assignment that reduces the network cost, the final phase assignment is selected from at least one additional phase assignment and which gates of the domino circuit to implement.

17. A computer-readable medium having computer-executable instructions for reducing a network cost of a circuit comprising:

partitioning the domino circuit into combinational blocks;

representing the domino circuit as a mixed integer linear program;

generating coefficients for at least one of the variables of the mixed integer linear program by modeling the network cost for the gate associated with the variable, wherein generating coefficients comprises setting the coefficient for each node by a value determined from the network cost;

solving the mixed integer linear program; and implementing only those gates and outputs that have corresponding variables equal to a predetermined value.

* * * * *